United States Patent [19]
Brown

[11] 3,993,444
[45] Nov. 23, 1976

[54] INTERMITTENT TIME CONTROLLED VAPOR DISPENSING DEVICE

[76] Inventor: Edward Leslie Brown, 5538 Rio Rancho Way, Riverside, Calif. 92504

[22] Filed: Oct. 15, 1974

[21] Appl. No.: 514,467

[30] Foreign Application Priority Data

Oct. 17, 1973 Germany ........................... 2351979

[52] U.S. Cl. ...................................... 21/126; 21/53; 21/55; 21/74 R; 21/77; 21/108; 21/121; 239/57; 239/60; 261/94; 261/DIG. 17; 261/DIG. 65

[51] Int. Cl.$^2$ ....................... A61L 9/00; A61L 9/01; A61L 9/04

[58] Field of Search ................... 21/53, 55, 74, 108, 21/109, 77, 112–119, 121–126; 239/57, 60, 70; 261/DIG. 17, DIG. 65, 94

[56] References Cited

UNITED STATES PATENTS

| | | | |
|---|---|---|---|
| 1,238,068 | 8/1917 | Slater et al. | 21/74 |
| 2,243,151 | 5/1941 | Fuld et al. | 239/57 |
| 2,614,820 | 10/1952 | Boydjieff | 21/126 |
| 3,522,935 | 8/1970 | Lewis | 239/60 |
| 3,589,563 | 6/1971 | Carragan | 239/70 |
| 3,633,881 | 1/1972 | Yurdin | 21/55 |
| 3,739,944 | 6/1973 | Rogerson | 239/70 |
| 3,804,592 | 4/1974 | Garbe | 21/126 |

*Primary Examiner*—Morris O. Wolk
*Assistant Examiner*—Dale Lovercheck
*Attorney, Agent, or Firm*—William C. Babcock

[57] ABSTRACT

A device having an open top container holding a quantity of a volatile paste like material within the interior of the container, which material is intermittently dispensed in vapor form to the ambient atmosphere. An electric circuit controlled motor is intermittently energized at predetermined time intervals to rotate a fan in the device for specific time periods to direct currents of air onto the exposed surface of the paste and transform the paste into vapor that is discharged outwardly from the container. A portion of the device is defined by apertured walls that surround the container, with the apertures of sufficiently small size that the container in the device is substantially concealed, and the apertures serving the further functions of permitting air to not only flow into the interior of the device through a first portion thereof but as the fan operates also forming the vapor from the paste material into a number of small streams thereof as the vapor discharges outwardly through a second portion of the apertures into the ambient atmosphere to mix therewith.

8 Claims, 5 Drawing Figures

4 4

INTERMITTENT TIME CONTROLLED VAPOR DISPENSING DEVICE

BACKGROUND OF THE INVENTION

1. Field of the Invention

Intermittent Time Controlled Vapor Dispensing Device.

2. Description of the Prior Art

In the past, various types of dispensing devices have been devised and used in which an aerosol material is intermittently discharged as a spray into a room by either a clock mechanism that forms a part of the device or an electrically operated valve that is also included as an integral part of the dispenser. Such prior art devices have been used in dispensing an aerosol liquid as a spray, with the aerosol liquid acting as a carrier for insecticides, room fresheners and the like.

The major operational disadvantage of such devices is that they are of a complicated mechanical structure, require the utmost precision in the manufacture thereof, and the pressurized aerosol liquid and dispensers used therewith are relatively expensive.

A major object of the present invention is to supply a device that does not require an aerosol pressurized liquid in its operation, has a simple mechanical structure, requires a minimum of maintenance attention, and utilizes a relatively inexpensive paste like volatile material, which material is transformed into vapor when a current of air is directed thereover. The material serves as a carrier for a deodorant, room freshener, insecticide, disinfectant, or the like.

A still further object of the invention is to provide a device that may be retailed at a sufficiently low price as to encourage its widespread use in homes, and one that will provide a number of operational advantages that were previously achieved only by the use of the expensive aerosol type dispensers previously identified.

SUMMARY OF THE INVENTION

The invention is adapted to be used with a paste like material disposed in an open topped container, with the material being volatile and vaporizing when a current of air at ambient temperature is directed thereover. The container is removably supported in a housing assembly that includes first and second opaque portions that are movable relative to one another, and the portions when in a first position having the container situated within the confines thereof.

The second portion of the housing assembly has a number of spaced apertures formed therein, with these apertures being of sufficiently small size as to substantially conceal the container from view when the device is viewed from the exterior. A first portion of the aperture permits air from the ambient atmosphere to be drawn into the interior of the housing and second portion of the apertures serve to transform vapor discharged from the material into a number of spaced minute streams thereof that are directed outwardly from the interior of the device, and these minute streams mixing with the ambient atmosphere to assure a complete diffusion of the vapor therethrough. The paste material previously mentioned will normally have a hydrocarbon base mixed with an inert material such as finely ground silica to obtain the paste consistency. The volatile material serves as a carrier for an insecticide, room freshener, deodorant, disinfectant or the like.

A bladed fan is situated within the confines of the housing assembly and is driven by an electric motor. The fan is so situated that as it is driven by the motor a current of air is directed downwardly onto the container to cause vaporization of the material contained therein and the vapor being subsequently transformed into a number of minutely spaced streams thereof that are discharged through a second portion of the apertures. The device has a source of electricity associated therewith such as one or more batteries or the like, but if desired, the device may be operated by domestic electric power when a suitable transformer is interposed between this source of power and the electric motor. The device includes an interval timer that operates intermittently to complete a circuit from the source of electricity to the motor for a predetermined time period and during this time period the fan is driven to discharge a current of air on to the paste like material to attain the result previously described.

DESCRIPTION OF THE PREFERRED EMBODIMENT

Figure 1:
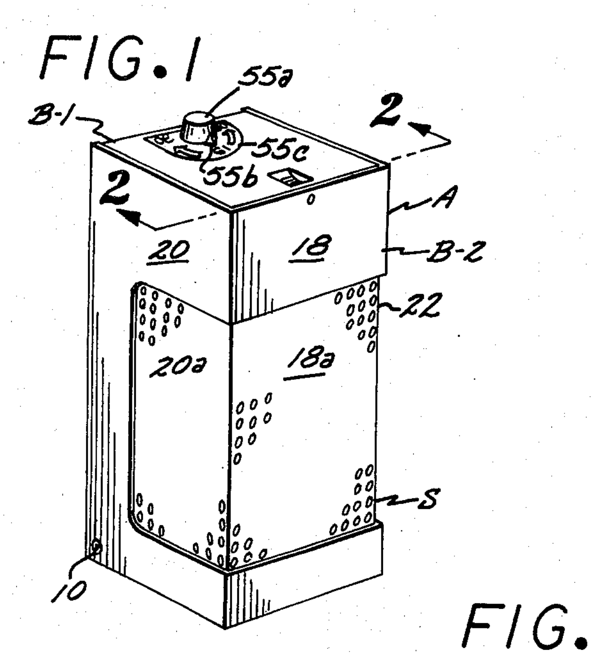
FIG. 1 is a perspective view of the device.

In FIG. 1 the apparatus of the present invention is indentified in its entirety by the letter A, and the device being defined externally by a housing assembly that includes a first portion B-1 that has a second portion B-2 pivotally connected thereto by two laterally spaced pins or rivets 10. First housing portion B-1 is defined by a rectangular opaque rigid back wall 12 best seen in FIG. 3 that has a top member 14 and bottom member 16 projecting forwardly therefrom. The apparatus A is described herein and as shown in the drawings is subject to the limitation any reference to "top" or "bottom" is to be taken as meaning that which appears in the drawings to be at the top or bottom as shown in FIG. 1, without regard for the fact that these relationships may be varied when the apparatus is disposed on the side or in an inverted position.

The second portion B-2 as may be seen in FIG. 1 includes a rigid opaque front wall 18 and two laterally spaced side walls 20 extending rearwardly therefrom. The front wall 18 and two side walls 20 are illustrated in the drawings as having substantial portions removed therefrom, and sheet materials having a number of small laterally spaced and vertically spaced apertures 22 therein being adhered to the interior surfaces of the front wall 18, and side walls 20. The sheet materials having the apertures 22 therein is further designated in the drawings by the numerals 18a and 20a, with the front wall 18, side walls 20 and sheet material 18a and 20a cooperating to provide an integral unit that comprises the second housing portions B-2.

Figure 2:
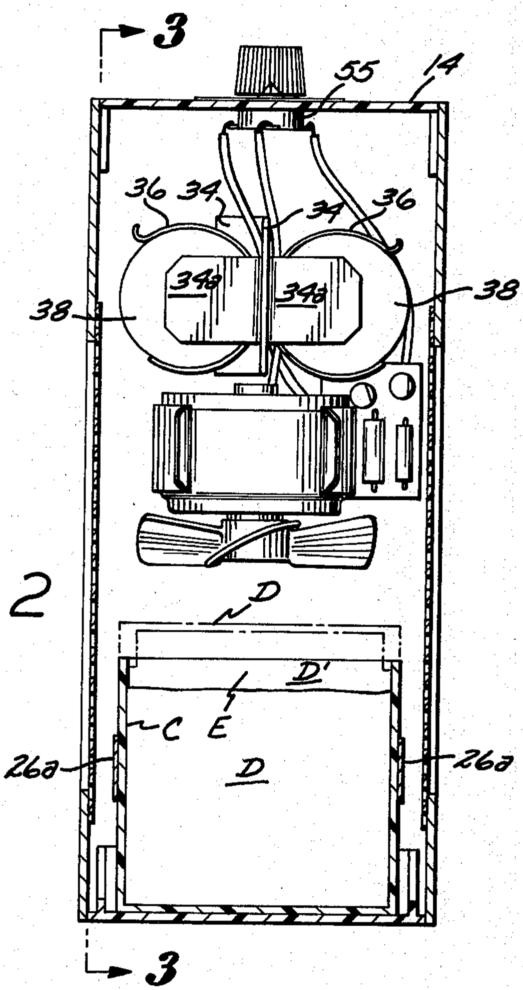
FIG. 2 is a longitudinal cross sectional view of the device taken on the line 2—2 of FIG. 3.
Figure 3:
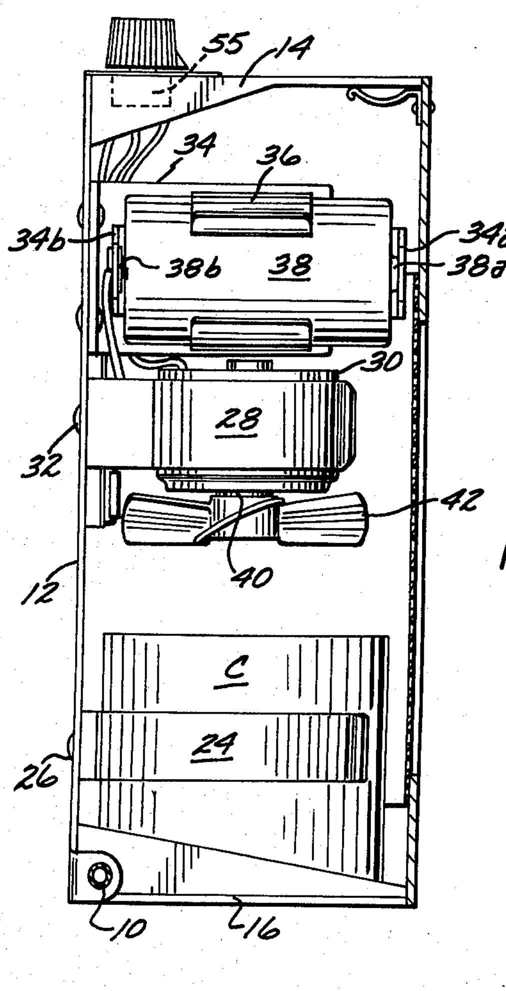
FIG. 3 is a longitudinal cross sectional view of the device taken on the line 3—3 of FIG. 2.
Figure 4:
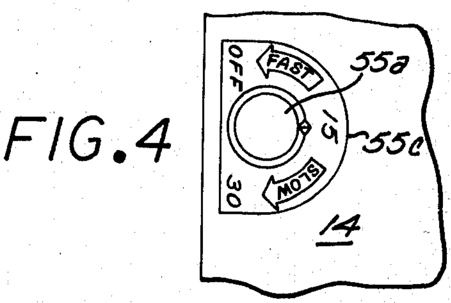
FIG. 4 is a fragmentary top plan view of the device.

The back wall 12 as may be seen in FIG. 3 has a resilient clip 24 adhered thereto by rivets 26 or other suitable fastening means, and the clip including two laterally spaced arms 26a as shown in FIG. 2 that resiliently grip opposite side walls of a rigid container C that is illustrated in FIG. 3 as being open topped. Container C as may be seen in FIG. 2 is adapted to have a cover D illustrated in phantom line mounted thereon when the device A is not in use.

The container C is illustrated in the drawings as being of cylindrical shape. Other forms of containers may be used if desired and the clip 24 being suitably modified to engage such forms. The container C serves to hold a quantity of paste like volatile material D that preferably gives off a vapor that is heavier than air, and this vapor D' when the material is not being dispensed lying is a space E in the container C above the material as shown in FIG. 2. This layer of heavier than air vapor D' serves to prevent vaporization of the material D except when the device A is actuated.

Although it is preferable to use a paste like material D that gives off a vapor heavier than air this is not essential. Likewise, it is not absolutely essential that the material D be of paste like consistency, as it could be a liquid if desired. However, the material D if not of paste like consistency has the operational disadvantage that it will spill or drain if the assembly A is inadvertently tilted or inverted. The material D above described is of a type that is commercially available from Aeromatics International, Marietta, Georgia and is sold as Neutrolene 11572 which is an odor absorber; Orange Blossom No. 11577; Fresh Air No. 11578; Strawberry No. 11575 and Cherry No. 11573. These are merely examples of materials that may be used in the invention.

The back board 12 also serves to support a second resilient clip 28 that frictionally engages an electric motor 30. The clip 28 is secured to back board 12 by rivets 32. An L-shaped bracket 34 is secured to the upper interior surface of back board 12 as may be seen in FIGS. 2 and 3 by conventional means. Bracket 34 supports two third U-shaped clips 36 on opposite sides thereof as shown in FIG. 3, which clips removably engage two dry cell batteries 38 such as used in flashlights. The batteries 38 have terminals **38*a* and 38*b* on the ends thereof that are in pressure contact with resilient legs 34*a* and 34*b* that extend outwardly from opposite sides of bracket 34.**

The motor 30 as shown in FIGS. 2 and 3 includes a drive shaft 40 that extends downwardly therefrom and supports a multi-bladed fan 42 that may be fabricated as an integral unit from plastic or like material. The fan 42 when driven by motor 30 directs a current of air at substantial velocity downwardly onto the upper surface of the paste like material D, and the vaporized material D' then being discharged outwardly through the apertures 22 in a substantially horizontal direction as minute streams thereof at substantial velocity into the ambient atmosphere to intimately mix therewith.

Figure 5:
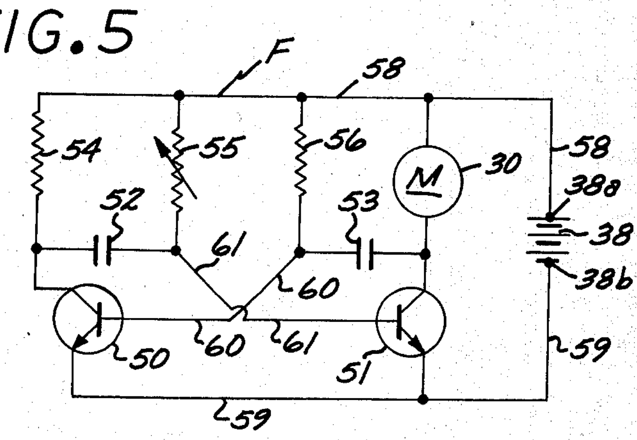
FIG. 5 is a schematic circuit diagram of the electric circuit which times the device.

Intermittent operation of the motor 30 is controlled by the electrical circuit F illustrated in FIG. 5. The electrical circuit F shown in FIG. 5 serves to intermittently allow electrical current to flow to the motor 30 for desired peroids of time, with the frequency of this intermittent operation being controllable as well as the length of time the motor 30 is energized.

The circuit F employs two transistors 50 and 51, together with two capacitors 52 and 53, and three resistors 54, 55 and 56. Resistors 54 and 56 are fixed resistors while resistor 55 is a variable resistor or potentiometer. The potentiometer 55 as may best be seen in FIGS. 1, 2 and 3 is preferably mounted on the top member 14 and is adjusted by use of a handle **55*a* that has a pointer 55*b* associated therewith that may be moved relative to a scale 55*c* fixed to the top member 14 as shown in FIG. 1. The resistance valves of the resistor 55 and the capacitor valves of the capacitors may vary over a wide range according to the desired time interval between energization peroids for the motor 30, as is well known in the electrical art. The base of transistor 50 is connected by a wire 60 to one side of the capacitor 52 and to one end of the resistor 56. The base of transistor 51 is connected by a wire 61 to one side of the capacitor 52 and to one end of the resistor 55. The terminals 38*a* and 38*b* of the battery 38 are connected to wires 58 and 59 as may be seen in FIG. 3. Wire 58 is connected through resistor 54 to the collector of transistor 50 and through the motor 30 to the collector of transistor 51. The emitters of both transistors 50 and 51 are connected to wire 59. Variable resistor or potentiometer 55 is connected between wire 58 and wire 61, while resistor 56 is connected between wire 58 and wire 60.**

In the circuit shown electricity from the battery 38 slowly charges the two capacitors 52 and 53, the rate of charge being governed by the resistance of the three resistors 54, 55 or 56. The two resistors 54 and 55 and the capacitor 52 cover the "off" time while the resistor 56 and capacitor 53 regulate the "on" time that the motor 30 operates to drive the fan 42. The variable resistor 55 is adjusted by use of the handle **55*a*, and by turning the knob or handle one way or another the resistance can be varied to enable the unit to vary the interval between the time periods in which electricity is delivered to the motor 30 to drive the fan 42 for the purpose previously described. By rotation of the knob 55*a* the unit may be shut off when the pointer 55*b* is aligned with "off" as imprinted on the scale 55*c*. By further rotation of the knob 55*a* the time interval between electrical energization of the motor 30 may be varied to either 15 or 30 minutes when the pointer 55*b* extends towards one of them as shown in FIG. 1.**

The second portion B-2 of the housing is removably held in an engaging position with the first portion B-1 by a conventional resilient locking L-shaped member that is best seen in FIG. 3. When the locking L-shaped member is disengaged from the first housing portion B-1 free access is had to the interior of the housing to permit the batteries 38 to be periodically replaced as well as the container C.

The use and operation of the invention has been described previously in detail and need not be repeated.

I claim:

1. In combination with an open top container holding a quantity of a paste-like material that is volatile and vaporizes when a current of air at ambient temperature is discharged thereon, a device for intermittently discharging a current of air onto the exposed surface of said material for a predetermined period of time at spaced time intervals of substantial duration to transform a portion of said material into vapor that is discharged outwardly from said device as a plurality of streams thereof, said device including:

a. a housing assembly that includes a first opaque portion defined by an elongate rigid backwall that has a top member and bottom member projecting forwardly therefrom, and a second opaque portion that includes a vertical front wall and two laterally spaced side walls that have a plurality of small apertures therein, said second opaque portion being pivotally mounted to said first opaque portion to be pivotable between a first and a second position, when said second opaque portion is in a first position it defines a confined space within the interior of said housing, a first portion of said apertures serving to permit the flow of air into said confined space and a second portion of said apertures permitting the concurrent discharge of said air outwardly therethrough from said confined space in a substantially horizontal direction and substantial velocity to the ambient atmosphere, with said apertures of sufficiently small size as to substantially obstruct viewing the interior of said housing from the exterior thereof;

b. first means for removably supporting said container in said confined space adjacent said bottom member;

c. a bladed fan in said confined space disposed above said container;

d. an electric motor that has a drive shaft to which said fan is secured;

e. second means for holding said motor, drive shaft and fan in a fixed position in said confined space in said housing;

f. a source of electricity; and g. and interval timer operable intermittently at spaced time intervals of substantial duration to send electric current from said source to said motor to operate the latter for predetermined periods of time, with said fan as it is rotated by said motor, drawing air into said confined space through said first portion of apertures and discharging a current of air at substantial velocity onto the exposed surface of said material in said container to transform said material into vapor that with the air is discharged through said second portion of apertures as a plurality of said streams.

2. A device as defined in claim 1 in which said interval timer is a resistance-capacitance circuit connected to said source and to said motor, said circuit including at least one capacitor that is slowly charged with electricity from said source over a predetermined time interval and then discharges through at least one resistor to operate said motor for a predetermined period of time.

3. A device as defined in claim 1 in which said resistance-capacitance circuit includes a manually adjustable potentiometer to control the time intervals between the energization of said motor by electric current from said source.

4. A device as defined in claim 2 in which said source of electricity is at least one battery. opaque opaque

5. A device as defined in claim 4 that in addition includes:

h. third means for removably supporting said battery in a fixed position in said confined space between said motor and said top member.

6. A device as defined in claim 5 in which said third means is a resilient clip secured to said back wall.

7. A device as defined in claim 1 which in addition includes:

h. lock means for removably maintaining said first and second opaque portions in said first position.

8. A device as defined in claim 1 in which said second opaque portion is pivotally connected to said first opague portion to permit said first and second portions to be pivoted to a second opaque position to have access to said confined space.

* * * * *